Sept. 6, 1927. 1,641,592
R. E. KAPPS
TRIPOD
Filed Jan. 30, 1924     2 Sheets-Sheet 2
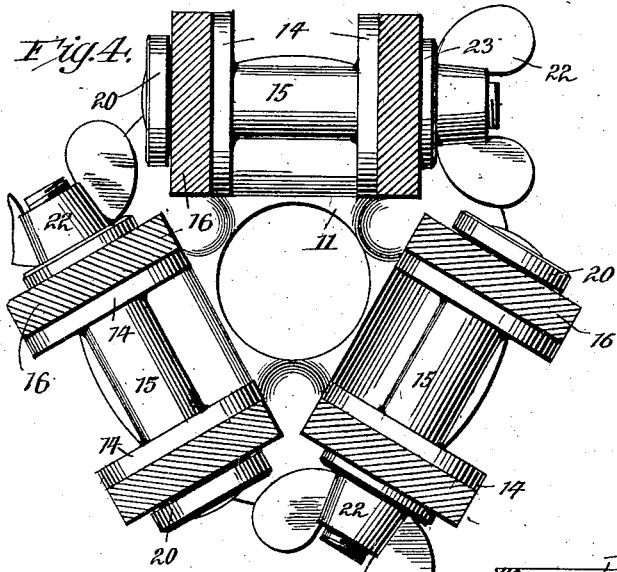
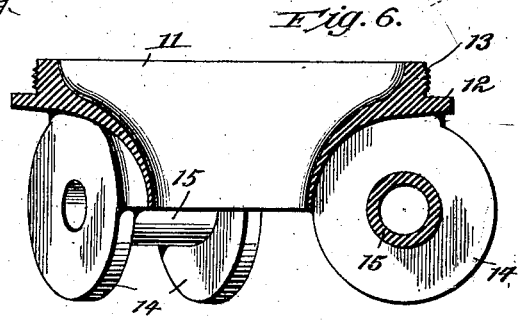
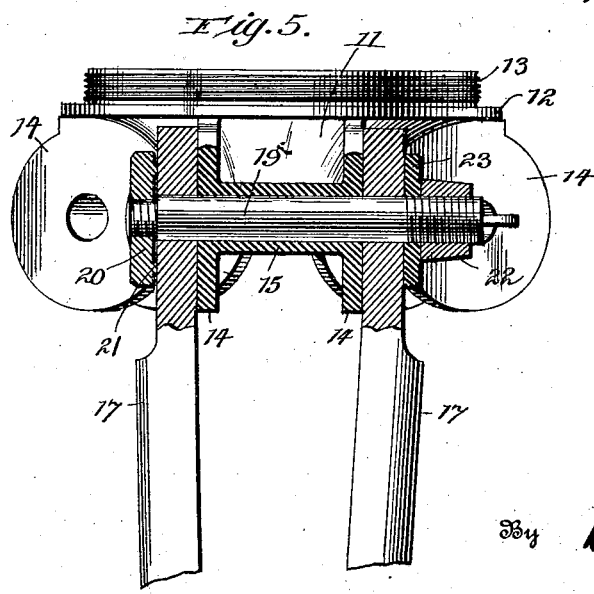
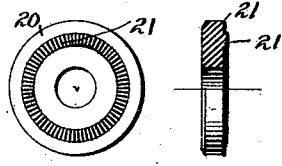
Inventor
Robert E. Kapps
By Dodge and Sons
Attorneys Patented Sept. 6, 1927.

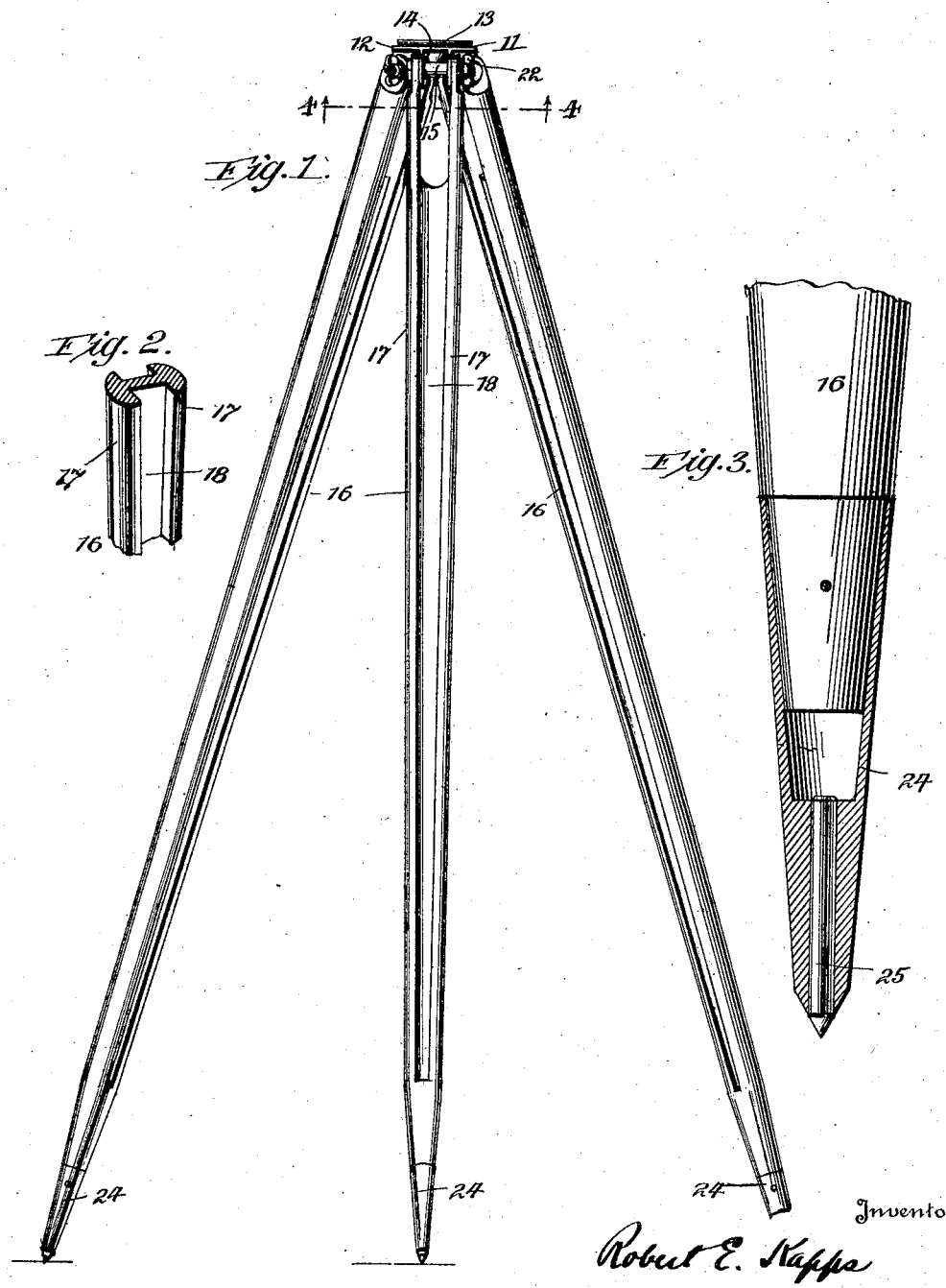

1,641,592

UNITED STATES PATENT OFFICE.

ROBERT E. KAPPS, OF TROY, NEW YORK, ASSIGNOR TO W. & L. E. GURLEY, OF TROY, NEW YORK, A CORPORATION OF NEW YORK.

TRIPOD.

Application filed January 30, 1924. Serial No. 689,482.

This invention relates to tripods for surveying instruments and particularly to various details of construction designed to reduce the weight, and increase the rigidity and durability of such tripods.

Important features of novelty are embodied in the construction of the head in such a way as to secure inherent rigidity with a minimum amount of metal, and also to eliminate any distortion of the head through the clamping action of the hinge screws which attach the legs. There are other incidental features of invention which will be brought out in connection with a detailed description of the preferred embodiment.

In the accompanying drawings:

Fig. 1 is a side elevation of a complete tripod;

Fig. 2 is a fragmentary perspective showing the cross-section of the leg members;

Fig. 3 is an enlarged axial section showing the construction of the metallic point used on the tripod legs;

Fig. 4 is an enlarged section taken on the line 4—4 of Fig. 1;

Fig. 5 is a side elevation of the tripod head with two of the legs removed and the third leg partly broken away to show the construction of the hinge joint;

Fig. 6 is a vertical transverse section through the tripod head;

Fig. 7 is an elevation showing the head of the clamp screw; and

Fig. 8 is a side view thereof, half in elevation and half in section.

The tripod head is formed of one piece of metal, preferably by casting. Any suitable material may be used, but I prefer bronze, this being the metal customarily used for devices of this character. The head includes a body portion 11 which is of annular inverted conoidal form, concave on its outer face. The thickness of the metal in the body 11 decreases from the top toward the bottom edge. Near the top it is provided with an annular flange 12 and above the flange 12 is threaded as shown at 13.

The flange 12 serves as a seat for, and the threads 13 are means for attaching, the base of a surveying instrument. Since the body 11 is of annular form, an opening is afforded for the passage of the plumb line.

Merging into the body 11, and partly housed in the concave outer face thereof, are lugs 14 arranged in three pairs. The lugs 14 of each pair are connected together by a tubular spacer or sleeve 15, preferably formed integrally with the lugs 14 and body 11. The purpose of the spacing members 15 is to resist the pull of the leg clamping bolt hereinafter described. The purpose of the conoidal form, concave outward, is to secure the maximum arc of connection for the lugs 14, with a minimum quantity of metal, and without limiting the swinging movement of the legs.

Each leg 16 is grooved on its opposite face as shown in Fig. 2, so as to produce an I-section having rounded heads 17 connected by a web 18. The legs 16 are tapered, but the height of the web 18 is commensurately tapered, so that the thickness of the head 17 is approximately constant throughout the length of the leg. This gives a light but rigid construction.

The web 18 is cut away at the upper end of each leg which is consequently bifurcated, and which is so dimensioned as just to straddle a pair of the connected lugs 14 on the tripod head. A clamping hinge connection is afforded by a bolt 19 whose head 20 is provided with an annular series of radial teeth or projections 21, which, under the pull of the bolt 19, bite into the wood of the legs 16 and hold the bolt against turning. In the drawings I show the head 20 as formed separately from the bolt 19 and permanently connected therewith by threading it onto one end of the bolt and then upsetting the end of the bolt. This is a manufacturing detail, however, and is not material to the present invention. At its opposite end the bolt 19 is threaded to receive a wing-nut 22 which seats against a washer 23.

This construction has a number of advantages. The lugs 14 offer a relatively large frictional surface, and together with the connection sleeve 15 offer a long bearing to the bolt 19. Furthermore, the bracing effect of the spacer 15 precludes distortion of the body 11 through the clamping action of the bolt 19 and nuts 22.

The serrations 21 are a peculiarly effective means for causing the bolt 19 to turn with the leg 16 as it swings. This it should do to relieve any tendency of the wing-nut 22 to unscrew. The single pin such as has been heretofore used to connect the head with the wood has been found unsatisfactory as it is likely to become bent and consequently ineffective.

The legs 16 are shod at their lower ends with cast bronze ferrules 24, into which are cast small inserted points 25, of steel. By casting the inserts 25 in the ferrules 24, it is possible to produce a tip having a very small amount of magnetic material. By casting the points in the ferrules, a strong and permanent mounting is had.

While the principal features of novelty are in the structure of the tripod head, the complete tripod has marked features of advantage. The legs are hinged so as to have a very smooth clamping action, which may be made as tight as desired, without any danger of distorting the tripod head or affecting its accuracy. Notwithstanding the marked rigidity of the head, it contains a minimum amount of metal and consequently is quite light. The possibility of securing this lightness arises from the adoption of the conoidal or conical section for the body, and more specifically from this feature in conjunction with lugs arranged in pairs and directly connected together by tubular members which give a long bearing to the clamping screws to withstand the clamping pull of the screws.

What is claimed is:

1. A head for tripods comprising in one piece an annular body of frusto-conoidal form relatively thick at its top and there formed with a shoulder and threads to receive an instrument base, said body tapering toward its lower margin, and the conoid elements being concave outward; and leg attaching lugs projecting from the outer conoidal surface of said body and braced together in pairs by intervening tubular connections.

2. A head for tripods comprising in one piece an annular body of inverted frusto-conoidal form tapering toward its lower margin, the elements of the bounding conoids being concave outward; and approximately circular leg attaching lugs joined with said body over the entire arc of the outer conoidal surface from top to bottom thereof, said lugs being connected by tubular spacers of less diameter disconnected from said body except through their connection with said lugs.

In testimony whereof I have signed my name to this specification.

ROBERT E. KAPPS.